(12) United States Patent
Osano et al.

(10) Patent No.: US 7,304,822 B2
(45) Date of Patent: Dec. 4, 2007

(54) MAGNETIC HEAD WITH MULTILAYER FILM INCLUDING METAL MAGNETIC FILMS AND NON-MAGNETIC FILMS AND MAGNETIC RECORDING/REPRODUCING DEVICE

(75) Inventors: Koichi Osano, Osaka (JP); Akinaga Natsui, Sakai (JP); Shunsaku Muraoka, Hirakata (JP); Noboru Itoh, Hirakata (JP); Syouzou Ninomiya, Moriguchi (JP); Kenji Hasegawa, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 129 days.

(21) Appl. No.: 10/523,104

(22) PCT Filed: Aug. 21, 2003

(86) PCT No.: PCT/JP03/10601

§ 371 (c)(1),
(2), (4) Date: Feb. 1, 2005

(87) PCT Pub. No.: WO2004/019319

PCT Pub. Date: Mar. 4, 2004

(65) Prior Publication Data

US 2006/0164755 A1     Jul. 27, 2006

(30) Foreign Application Priority Data

Aug. 22, 2002  (JP) ............................. 2002-242498

(51) Int. Cl.
  *G11B 5/147*   (2006.01)
  *G11B 5/31*    (2006.01)
(52) U.S. Cl. ...................................... 360/126; 360/125

(58) Field of Classification Search ................ 360/125, 360/126, 119
See application file for complete search history.

(56) References Cited

U.S. PATENT DOCUMENTS 4,695,908 A * 9/1987 Imakoshi et al. ........... 360/119

(Continued)

FOREIGN PATENT DOCUMENTS

JP          64-23411         1/1989

(Continued)

*Primary Examiner*—Jefferson Evans
(74) *Attorney, Agent, or Firm*—Hamre, Schumann, Mueller & Larson, P.C.

(57) ABSTRACT

In a magnetic head, a multilayer film is disposed, the multilayer film including metal magnetic films and non-magnetic films that are alternately laminated, and a boundary between the multilayer film and a magnetic oxide substrate or a non-magnetic substrate on which the multilayer film is to be formed is parallel with a gap section at a surface of the magnetic head for sliding with respect to a magnetic recording medium. The metal magnetic films constituting the multilayer film have two or more types of thickness, or the metal magnetic films constituting the multilayer film have a uniform thickness, and the uniform thickness t satisfies $t < v \times \cos\theta / f_{max}$, where v denotes a relative speed of the head to the recording medium, $f_{max}$ denotes an upper limit of frequencies to be used and $\theta$ denotes an azimuth angle. With this configuration, a magnetic head having a suppressed pseudo signal and reduced noise can be provided, and a magnetic recording/reproducing device incorporating this magnetic head can be provided.

10 Claims, 8 Drawing Sheets

U.S. PATENT DOCUMENTS

| | | | |
|---|---|---|---|
| 5,278,716 A * | 1/1994 | Okuda et al. | 360/126 |
| 5,452,167 A * | 9/1995 | Nago | 360/126 |
| 6,493,182 B1 * | 12/2002 | Yamanaka et al. | 360/122 |
| 6,717,770 B1 * | 4/2004 | Crawford | 360/125 |

FOREIGN PATENT DOCUMENTS

| | | |
|---|---|---|
| JP | 7-296321 | 11/1995 |
| JP | 8-147621 | 6/1996 |
| JP | 2959908 | 7/1999 |

* cited by examiner

MAGNETIC HEAD WITH MULTILAYER FILM INCLUDING METAL MAGNETIC FILMS AND NON-MAGNETIC FILMS AND MAGNETIC RECORDING/REPRODUCING DEVICE

TECHNICAL FIELD

The present invention relates to a magnetic head for high-density recording that has an excellent property at high frequencies and relates to a magnetic recording/reproducing device provided with the magnetic head.

BACKGROUND ART

In accordance with the trend toward higher-density magnetic recording, a magnetic head including a metal magnetic film having a high saturation flux density and a high magnetic permeability provided close to a gap has been put to practical use in order to allow for sufficient recording/reproducing properties with respect to a magnetic medium having a high coercive force. With such a trend toward densification, the transfer rate of signals should be raised, and therefore still higher-frequency properties are currently demanded. In order to satisfy such a demand, a magnetic head having a cross-sectional configuration as shown in FIG. 1 has been proposed conventionally (Japanese Patent No. 2959908). FIG. 9 is an enlarged view of a portion around a gap of this magnetic head. This magnetic head is configured as follows: a magnetic metal film 8 and a non-magnetic layer 9 such as $SiO_2$ or $Al_2O_3$ are alternately formed by sputtering or the like on a substrate 1 to form a laminated film, the substrate 1 being made of a magnetic oxide or being non-magnetic, in which a winding window 10 is formed. Subsequently, a gap member having a predetermined thickness is deposited for forming a gap 3, and then magnetic cores are bonded via the gap by glass or the like so as to be integrated. Reference numeral 5 denotes a welded glass. The multilayer film is used for enhancing high-frequency properties, because such a multilayer configuration allows a magnetic permeability at high frequencies to be increased compared with that of a single-layer metal magnetic film. FIG. 2 shows one example of a configuration of a surface at which a magnetic head slides with respect to a magnetic medium. In FIGS. 1 to 2 and FIG. 9, reference numeral 2 denotes a magnetic multilayer film constituting a core of the magnetic head, 4 denotes a winding window of the magnetic head, 6 denotes a welded glass, 7 denotes an interface between the substrate 1 and the magnetic multilayer film 2, 10 denotes a groove for forming the winding window, and 12 denotes an azimuth angle.

In FIG. 2, the gap 3 is parallel with the interface 7 between the metal magnetic multilayer film and the substrate 1, and the respective non-magnetic layers 9 also are parallel with the gap 3. When recording and reproducing are performed with the thus configured magnetic head, the respective non-magnetic layers that are parallel with the gap function as a pseudo gap, so that a pseudo signal is superimposed and a distortion occurs in a reproduced signal, thus increasing noise. Furthermore, a magnetic recording/reproducing device provided with such a magnetic head having a pseudo signal has a problem of degradation of S/N.

DISCLOSURE OF THE INVENTION

In order to cope with the above-stated problems, in a magnetic head of the present invention, a multilayer film is disposed including metal magnetic films and non-magnetic films that are alternately laminated, and a boundary between the multilayer film and a magnetic oxide substrate or a non-magnetic substrate on which the multilayer film is to be formed is parallel with a gap section at a surface of the magnetic head for sliding with respect to a magnetic recording medium.

In this magnetic head, the metal magnetic films constituting the multilayer film have two or more types of thickness, or the metal magnetic films constituting the multilayer film have a uniform thickness, and the uniform thickness t satisfies $t < v \times \cos\theta / f_{max}$, where v denotes a relative speed of the head to the recording medium, $f_{max}$ denotes an upper limit of frequencies to be used and $\theta$ denotes an azimuth angle.

A magnetic recording/reproducing device of the present invention is provided with a magnetic head, in which a multilayer film is disposed, the multilayer film including metal magnetic films and non-magnetic films that are alternately laminated, and a boundary between the multilayer film and a magnetic oxide substrate or a non-magnetic substrate on which the multilayer film is to be formed is parallel with a gap section at a surface of the magnetic head for sliding with respect to a magnetic recording medium. In this magnetic head, the metal magnetic films constituting the multilayer film have two or more types of thickness, or the metal magnetic films constituting the multilayer film have a uniform thickness, and the uniform thickness t satisfies $t < v \times \cos\theta / f_{max}$, where v denotes a relative speed of the head to the recording medium, $f_{max}$ denotes an upper limit of frequencies to be used and $\theta$ denotes an azimuth angle.

BRIEF DESCRIPTION OF DRAWINGS

FIG. 8 shows a manufacturing process of Embodiments 1 to 3 of the present invention, where

BEST MODE FOR CARRYING OUT THE INVENTION

Conventionally, a multilayer film is configured by laminating metal magnetic layers having a uniform thickness. On the other hand, according to the present invention, a multilayer film is configured by laminating metal magnetic layers having different thicknesses or by making the thickness of the metal magnetic films constituting the multilayer film uniform. Herein, this thickness t satisfies t<v×cosθ/fmax, where v denotes a relative speed of the head to the recording medium, fmax denotes an upper limit of frequencies to be used and θ denotes an azimuth angle, whereby a pseudo signal can be suppressed and noise can be reduced.

A magnetic recording/reproducing device of the present invention is provided with a magnetic head including metal magnetic films constituting the multilayer film having two or more types of thickness, or the metal magnetic films constituting the multilayer film having a thickness t satisfying t<v×cosθ/f, whereby the magnetic recording/reproducing device can be substantially free from the influence of pseudo signals of the magnetic head.

If a difference in thicknesses of the metal magnetic films is less than 5%, a remarkable effect of reducing a pseudo signal cannot be observed, so that it is preferable that the difference in thicknesses is 5% or more. In the case of the film thicknesses being differentiated, it is preferable that the metal magnetic films constituting the multilayer film have thicknesses varied within a range of 100 nm to 2000 nm.

Alternatively, in the case of the film thicknesses not being differentiated, it is preferable that the metal magnetic films constituting the multilayer film have a uniform thickness within a range of 100 nm to 2000 nm.

Preferably, the magnetic films include a magnetic alloy film having a composition represented by the following formula:

$$Ta_M b_X c_N d$$

where T denotes at least one element selected from the group consisting of Fe, Co and Ni, M denotes at least one element selected from the group constituting of Nb, Zr, Ti, Ta, Hf, Cr, Mo, W and Mn, X denotes at least one element selected from the group consisting of B, Si and Ge, and N denotes nitrogen, wherein a, b, c and d represent atomic % satisfying $65 \leq a \leq 93$, $4 \leq b \leq 20$, $0 \leq c \leq 20$, $2 \leq d \leq 20$ and a+b+c+d=100, respectively.

Furthermore, it is preferable that the non-magnetic films include an oxide of Si, Al, Ti, Cr or Ta.

Furthermore, it is preferable that the substrate includes: magnetic Mn—Zn ferrite single crystal; non-magnetic ferrite single crystal; α-hematite; calcium titanate or magnesium titanate.

The following describes embodiments of the present invention, with reference to the drawings.

Embodiment 1

Figure 1:
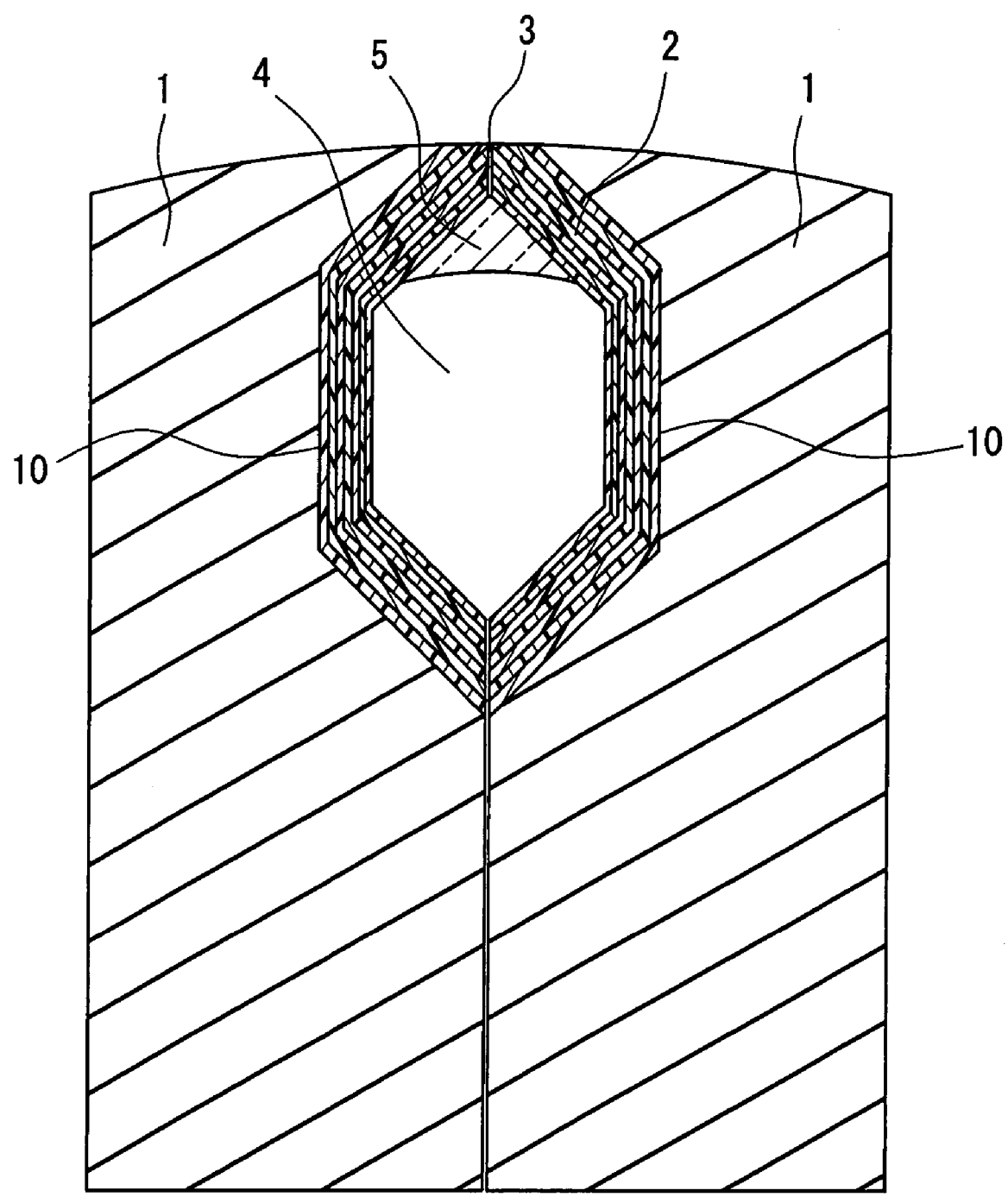
FIG. 1 is a cross-sectional view of a conventional general magnetic head.
Figure 2:
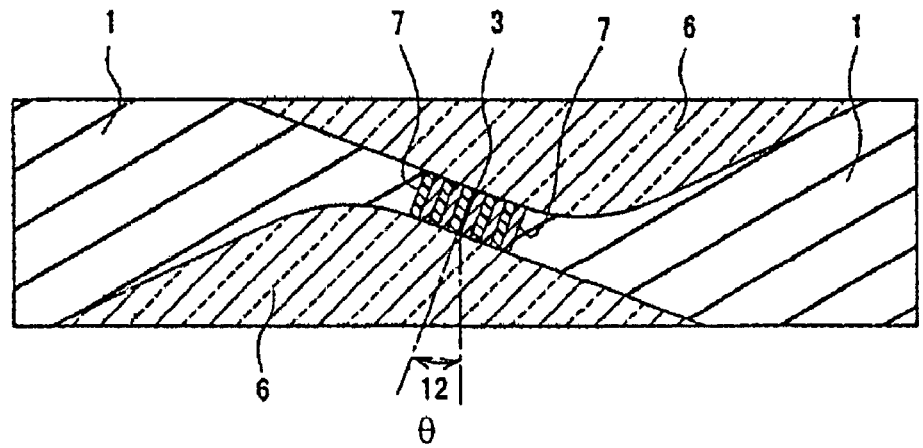
FIG. 2 shows a surface at which the magnetic head slides with a magnetic recording medium.
Figure 4:
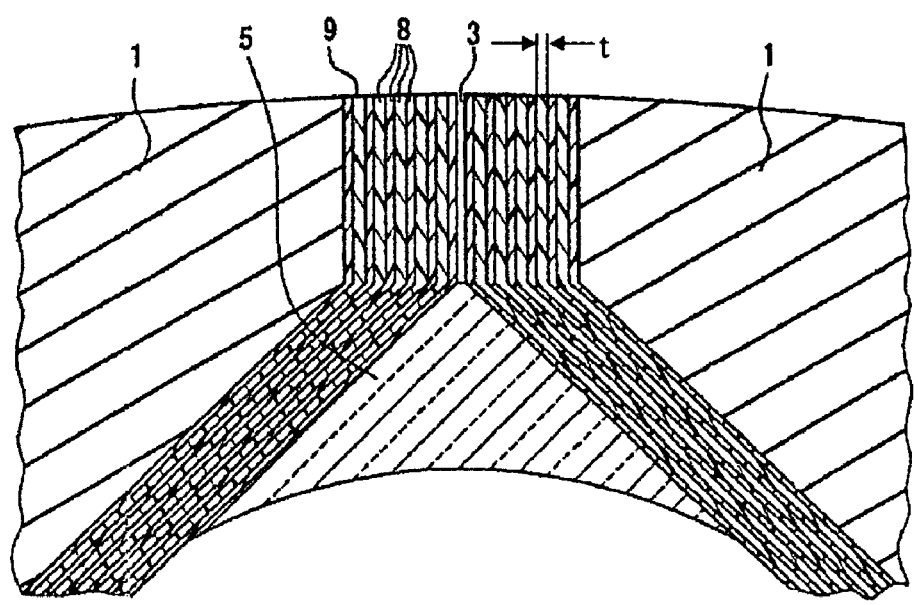
FIG. 4 is an enlarged cross-sectional view of a portion around a gap of a magnetic head according to Embodiments 1 to 3 of the present invention.
Figure 5:
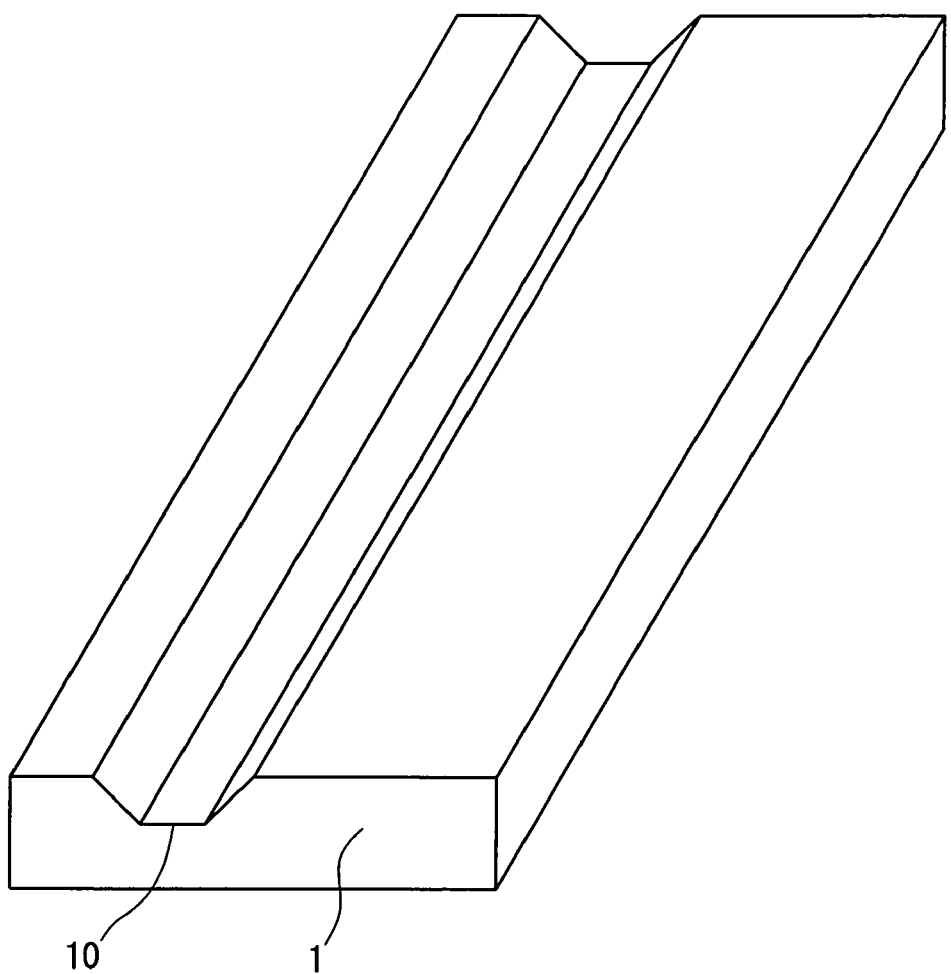
FIG. 5 shows a step for manufacturing a winding window in a substrate that constitutes a core of the magnetic head according to Embodiments 1 to 3 of the present invention.
Figure 6:
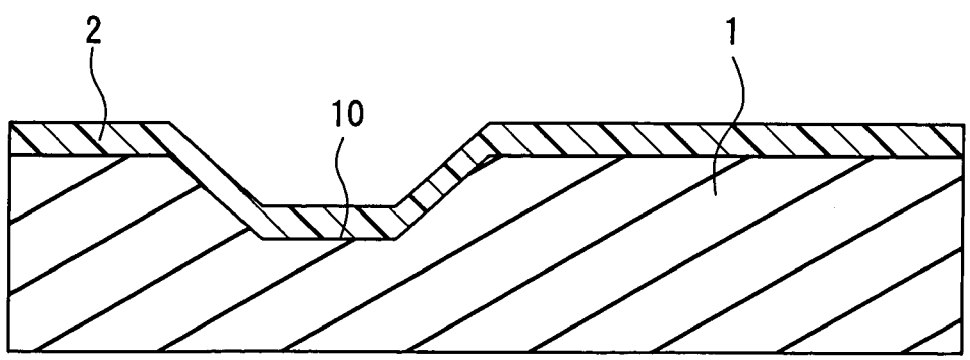
FIG. 6 is a cross-sectional view of a core on which a magnetic multilayer film has been deposited according to Embodiments 1 to 3 of the present invention.
Figure 8A:
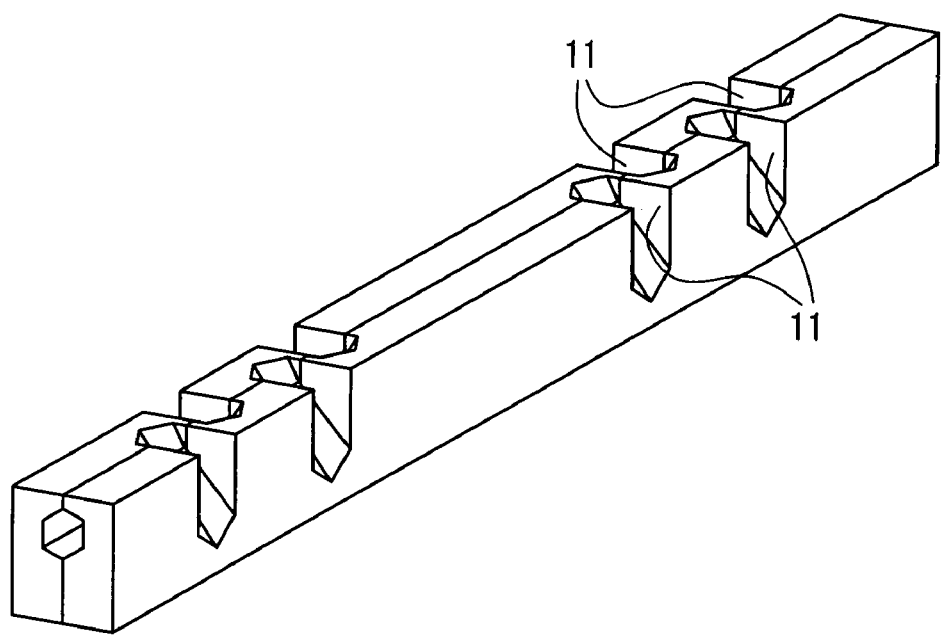
FIG. 8A shows a step for manufacturing grooves for forming tracks in cores bonded via a gap.
Figure 8B:
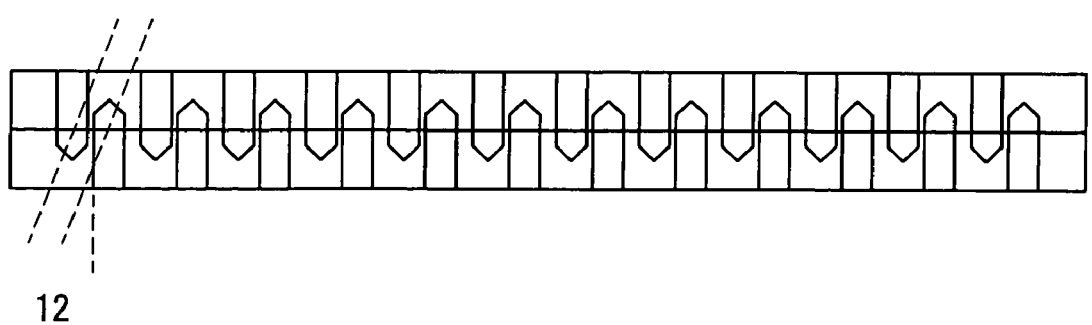
FIG. 8B shows a step for cutting into chips, following the formation of the tracks.

In FIG. 5, Mn—Zn ferrite single crystal was used as a substrate 1. Firstly, as shown in FIGS. 5 and 6, a groove 10 for forming a winding window 4 was formed using a grinding stone. Next, as shown in FIG. 4, which is an enlarged view of a portion around a gap, FeTaN films 8 and SiO₂ films 9 as non-magnetic layers were alternately formed on the above Mn—Zn ferrite single crystal so as to form a laminated film 2, where the FeTaN films 8 were formed by sputtering in a mixed gas of Ar gas and N₂ (nitrogen) gas using a Fe—Ta target, and the SiO₂ films 9 were formed in Ar gas. The thicknesses of the FeTaN films 8 as the magnetic multilayer film included two types of 0.5 μm and 1 μm, which were alternately laminated. The thickness of a SiO₂ film 9 was 10 nm. The overall film thickness was about 6 μm. Next, a gap member was deposited for forming a gap 3 and core halves were bonded so as to sandwich the gap 3 therebetween. As shown in FIG. 8A, grooves 11 for forming tracks were manufactured with respect to the thus bonded core using a grinding stone, which was then cut into chips to have the gradient of an azimuth angle 12 relative to the gap as shown in FIG. 8B, whereby a magnetic head was prepared. A configuration of the surface for sliding with respect to the magnetic medium was as shown in FIG. 2.

Figure 10:
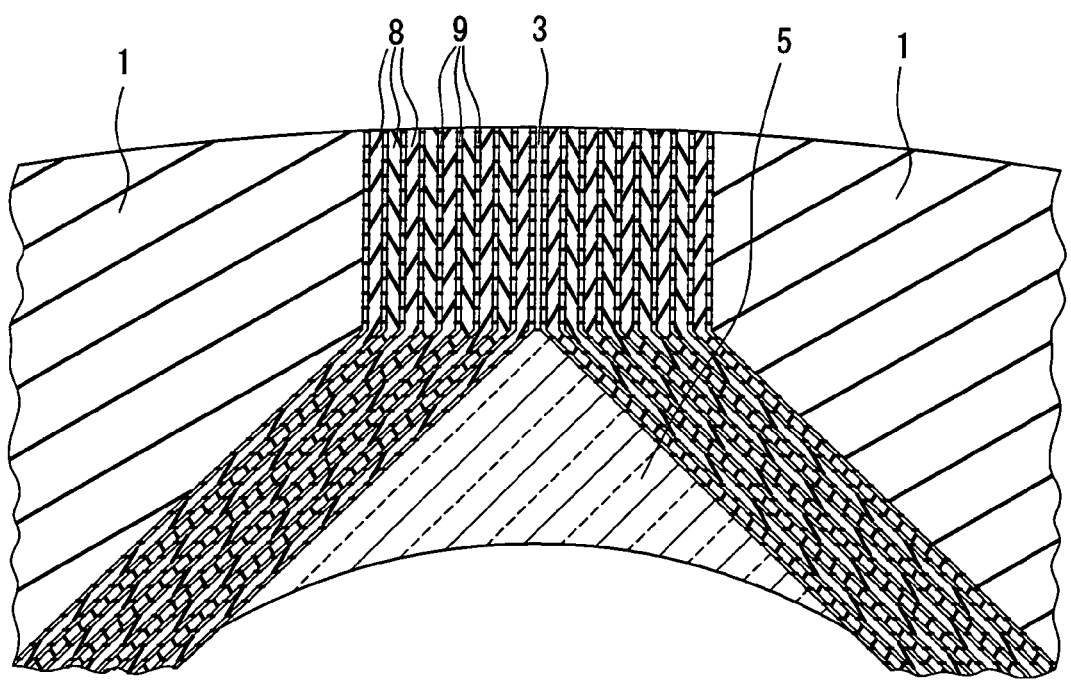
FIG. 10 is an enlarged cross-sectional view of a portion around a gap of a conventional magnetic head.

Meanwhile, for comparison with this, a magnetic head was formed similarly, where when the magnetic multilayer film 2 was formed, the thickness of FeTaN films 8 as the magnetic films was made constant at 0.5 μm and the thickness of the SiO₂ films 9 as the non-magnetic layers was set at 10 nm as shown in FIG. 10, so that the overall film thickness of the laminated film was about 6 μm.

Signals were recorded/reproduced on/from a magnetic tape actually using the magnetic head of the present embodiment having the magnetic multilayer film configured as shown in FIG. 4 and the magnetic head having the conventional configuration as shown in FIG. 10. Then, their properties were measured for comparison. As a result of the measurement of the output of the conventional magnetic head, undulation of the output was found in the frequency dependency of the output, which was due to a pseudo signal. The magnitude of the undulation was 3 dB on average. On the other hand, the undulation of the output due to a pseudo signal in the magnetic head of the present embodiment was 1 dB on average, so that it was found that the undulation could be reduced compared with the conventional magnetic head.

Figure 11:
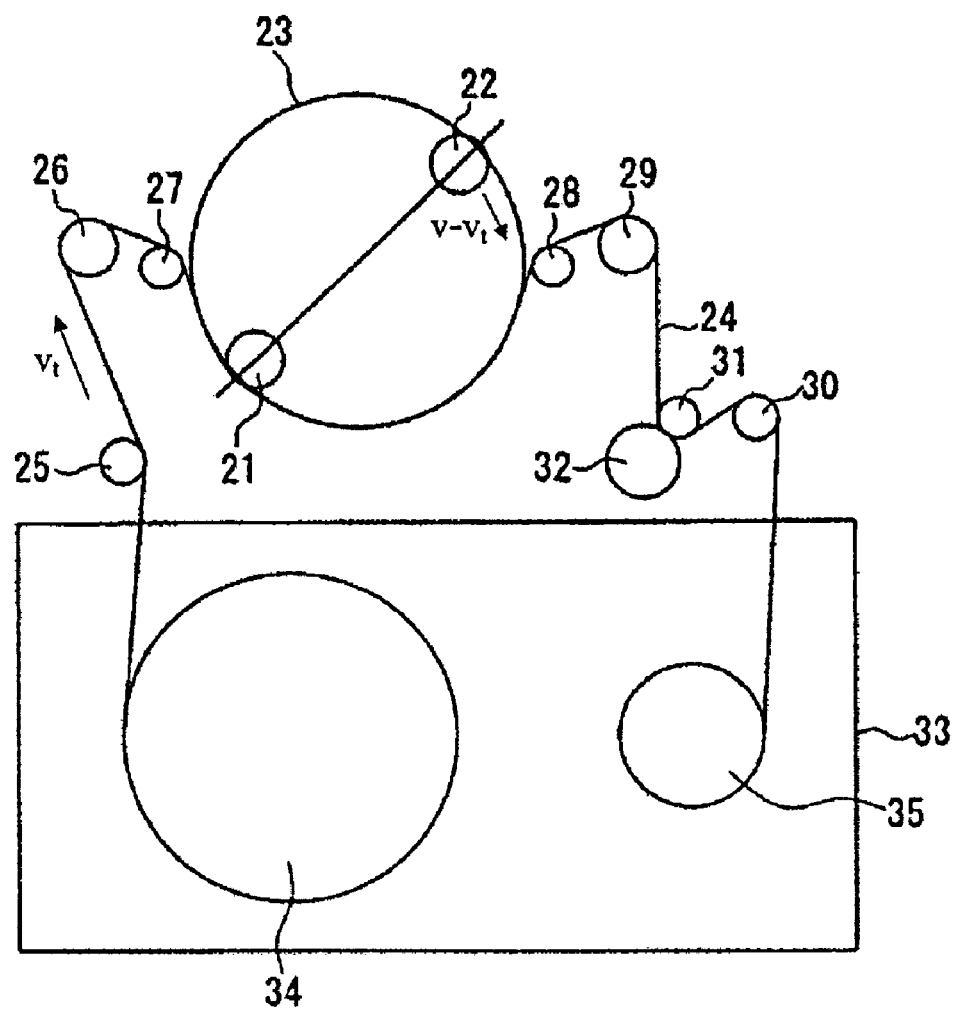
FIG. 11 schematically shows a configuration of a magnetic recording/reproducing device according to one embodiment of the present invention.

FIG. 11 schematically shows a configuration of a magnetic recording/reproducing device including a drum unit, which is provided with a magnetic head according to one embodiment of the present invention. In FIG. 11, a drum unit 23 for performing recording/reproducing with respect to a magnetic tape 24 is provided with magnetic heads 21 and 22 having mutually different azimuth angles. The tape 24 is guided by guideposts 25 to 30 while by using a capstan 31 and a pinch roller 32 so as to be supplied from a feeding reel 34 of a cassette 33 to a takeup reel 35 by way of the drum unit 23. While the magnetic tape 24 is wound around the drum unit 23 rotating at high speed, recording and reproducing are performed with respect to the magnetic tape 24 using the magnetic heads 21 and 22.

Embodiment 2

Figure 3:
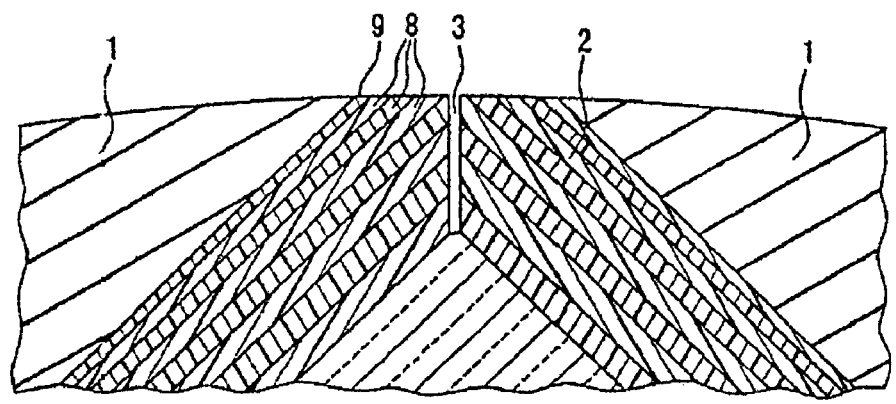
FIG. 3 is an enlarged cross-sectional view of a portion around a gap of a magnetic head according to Embodiment 2 of the present invention.
Figure 7:
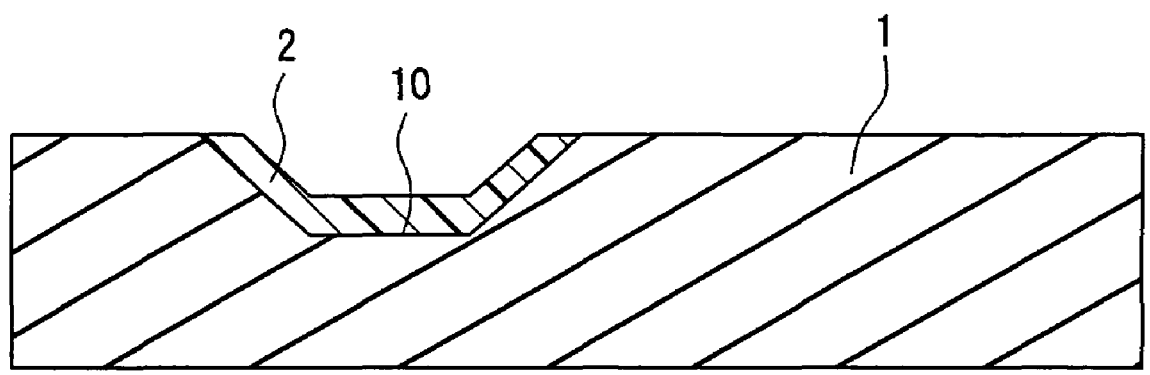
FIG. 7 shows a state after the core of FIG. 6 is subjected to lapping.

Non-magnetic ferrite single crystal was used as a substrate 1. Firstly, as shown in FIG. 5, a groove 10 for forming a winding window 4 was formed using a grinding stone. Next, as shown in FIG. 3, which is an enlarged view of a portion around a gap, FeTaN films 8 and Al₂O₃ films 9 as non-magnetic layers were formed alternately on the above non-magnetic ferrite single crystal so as to form a laminated film 2, where the FeTaN films 8 were formed by sputtering in a mixture gas of Ar gas and N₂ (nitrogen) gas using a Fe—Ta target, and the Al₂O₃ films 9 were formed in Ar gas. The FeTaN films 8 as the magnetic multilayer film were laminated so that the thickness increased gradually by 0.05 μm. More specifically, the first layer had a thickness of 0.5 μm, the second layer had a thickness of 0.55 μm, the third layer had a thickness of 0.60 μm . . . The thickness of an Al$_2$O$_3$ film 9 was 5 nm. The overall film thickness was about 20 μm. Next, as shown in FIG. 7, the surface in which a gap 3 was to be formed was ground by lapping so that the magnetic multilayer film 2 was left only in the winding window 4, and then a gap member was deposited and core halves were bonded so as to sandwich the gap 3 therebetween. As shown in FIG. 8A, grooves 11 for forming tracks were manufactured in the bonded cores using a grinding stone, which was then cut into chips to form the gradient of an azimuth angle 12 of 20° relative to the gap as shown in FIG. 8B, whereby a magnetic head was prepared. A configuration of the surface for sliding with respect to the magnetic medium was as shown in FIG. 2.

Figure 9:
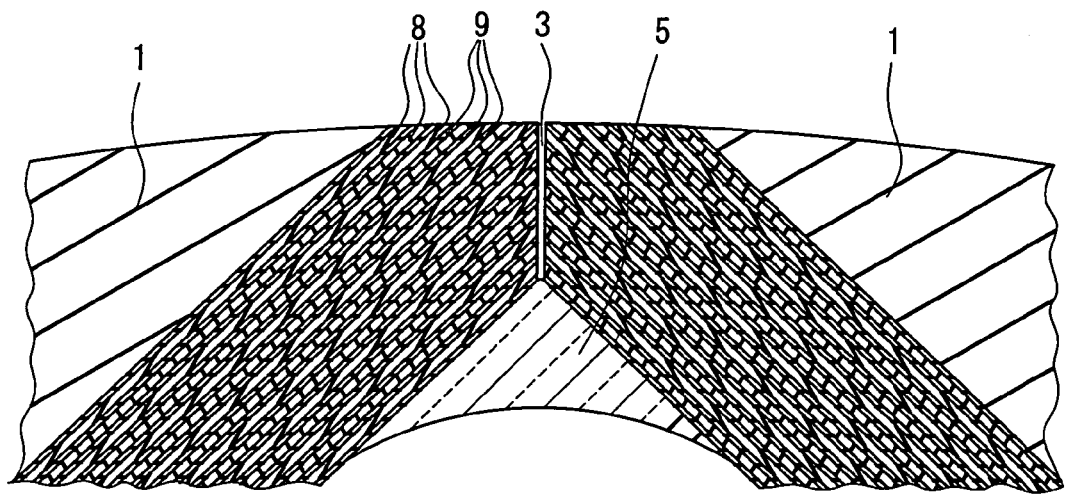
FIG. 9 is an enlarged cross-sectional view of a portion around a gap of a conventional magnetic head.

Meanwhile, for comparison with this, a magnetic head was formed similarly, where when the magnetic multilayer film 2 was formed, the thickness of the FeTaN films 8 as the magnetic films was made constant at 0.5 μm and the thickness of the Al$_2$O$_3$ films 9 as the non-magnetic layers was set at 5 nm as shown in FIG. 9, so that the overall film thickness was about 20 μm. Except for the configuration of the magnetic multilayer film of FIG. 9, this magnetic head had the same configuration as that of the magnetic head of the above-described embodiment.

Signals were recorded/reproduced on/from a magnetic tape actually using the magnetic head of the present embodiment shown in FIG. 3 and the magnetic head shown in FIG. 9. Then, their properties were measured for comparison. As a result of the measurement of the output of the conventional magnetic head, undulation of the output was found in the frequency dependency of the output, which was due to a pseudo signal. The magnitude of the undulation was 4 dB on average. On the other hand, the undulation of the output due to a pseudo signal in the magnetic head of the present embodiment was 1 dB on average.

In this embodiment, although the non-magnetic ferrite single crystal substrate was used as the substrate, even when Mn—Zn ferrite as a magnetic substrate was used instead, the same effects as in the non-magnetic substrate could be obtained concerning the reduction of a pseudo signal by virtue of the configuration with different film thicknesses.

Embodiment 3

Non-magnetic ferrite single crystal was used as a substrate 1. Firstly, as shown in FIG. 5, a groove 10 for forming a winding window 4 was formed using a grinding stone. Next, as shown in FIG. 6 and FIG. 9, which is an enlarged view of a portion around a gap, FeTaN films 8 and SiO$_2$ films 9 as non-magnetic layers were alternately formed on the above non-magnetic ferrite single crystal so as to form a laminated film 2, where the FeTaN films 8 were formed by sputtering in a mixture gas of Ar gas and N$_2$ (nitrogen) gas using a Fe—Ta target, and the SiO$_2$ films 9 were formed in Ar gas. The thickness of a FeTaN film 8 laminated as the magnetic multilayer film was made uniform. Herein, samples were prepared including the FeTaN films 8, one layer of the FeTaN films 8 of each sample being 0.25 μm, 0.5 μm, 1 μm and 2 μm in thickness, and the thickness of their SiO$_2$ films 9 was 5 nm. The overall film thickness was about 20 μm, which was common to all of the samples. Next, as shown in FIG. 7, the surface in which a gap 3 was to be formed was ground by lapping so that the magnetic multilayer film 2 was left only in the winding window 4, and then a gap member was deposited and core halves were bonded so as to sandwich the gap 3 therebetween. As shown in FIG. 8A, grooves 11 for forming tracks were manufactured in the bonded cores using a grinding stone, which was then cut into chips to form the gradient of an azimuth angle 12 ($\theta=0°$) relative to the gap as shown in FIG. 8B, whereby a magnetic head was prepared. Furthermore, as for the sample with the magnetic layers of 1 μm in thickness, magnetic heads were prepared so that the gradient of the azimuth angle 12 for cutting into chips was changed as in 10°, 20°, and 30°, in addition to ($\theta=0°$). A configuration of the surface for sliding with respect to a magnetic medium was as shown in FIG. 2.

Actually, signals were recorded/reproduced on/form a magnetic tape, and their properties were measured for comparison. Firstly, when the output of the magnetic heads each having a different film thickness and $\theta=0°$ was measured, then undulation of the output was found in the frequency dependency of the output, which was due to a pseudo signal. It was found that this undulation depended on the thickness t of the magnetic films 8 constituting the multilayer film 2 and appeared intensively especially around a specific frequency. When the frequency dependency of the output was measured where the relative speed v of the magnetic tape to the magnetic head was set at 10.5 m/s and 21 m/s and the frequency was below 80 MHz, the values of the specific frequencies in which the undulation of the output occurred in the respective magnetic heads were as shown in Table 1.

TABLE 1

| | frequency (MHz) | |
|---|---|---|
| Thickness of one layer of magnetic films | Relative speed = 10.5 m/s | Relative speed = 21 m/s |
| t = 0.25 μm | 41 | — |
| t = 0.5 μm | 21, 42, 63 | 42 |
| t = 1 μm | 10.3, 20.5, 31, 41 | 21, 42, 64 |
| t = 2 μm | 5.3, 10.6, 16, 21 | 10.4, 21, 31, 42 |

As a result of the analysis of these frequency values, it was found that the undulation of the output occurred intensively especially around $f=n \times v/t$, where v denotes the relative speed of the magnetic tape to the magnetic head, t denotes the thickness of the magnetic film 8 and n are integers (=1, 2 ...).

Furthermore, for the magnetic heads with the thickness of the magnetic layer of 1 μm and the azimuth angles of $\theta=0°$, 10°, 20° and 30°, the frequency dependency of the output was measured similarly, where the relative speed of the magnetic tape to the magnetic head was fixed at 10.5 m/s and the frequency was set below 50 MHz. The values of the frequencies at which a pseudo signal appeared especially intensively were listed in Table 2.

TABLE 2

| Azimuth angle $\theta$ (°) | Frequency (MHz) |
|---|---|
| 0 | 10.3, 20.5, 31, 41 |
| 10 | 10.1, 20.2, 30.7, 40.5 |
| 20 | 9.5, 19.5, 29.0, 38.5 |
| 30 | 9.0, 18, 26.8, 35.5 |

From these results, it was found that as the azimuth angle became larger, the frequency at which a pseudo signal occurred was shifted to the lower frequency side. As a result of the analysis of these values, in the case of the azimuth angles $\theta \neq 0°$, the frequency at which a pseudo signal appeared could be represented with reference to the case of the frequency of $\theta=0°$ as follows:

$$f(\theta)=f(\theta=0°) \times \cos\theta.$$

With consideration given to this together with the thickness dependency of the magnetic layers, the frequency at which a pseudo signal occurs intensively can be represented as follows, where v denotes the relative speed of the magnetic tape to the magnetic head, t denotes the thickness of the magnetic film 8 of the magnetic head, θ denotes the azimuth angle and n denotes an integer (=1, 2 . . . ):

$$f = n \times v \times \cos\theta / t$$

That is to say, although a pseudo signal, in general, occurs intensively at a plurality of frequencies, the smallest frequency among them is v×cosθ/t, which corresponds to that of n=1.

From these results, a magnetic recording/reproducing device may be provided with a magnetic head that satisfies fmax<v×cosθ/t, where v denotes a relative speed of the magnetic head to a magnetic tape and fmax is the upper limit of frequencies to be used, whereby the magnetic recording/reproducing device can be substantially free from the influence of pseudo signals of the magnetic head.

Note here that the magnetic head provided in the magnetic recording/reproducing device of the present embodiment adopts the non-magnetic ferrite as the substrate 1. However, even in a magnetic head adopting a magnetic substrate such as MnZn single crystal ferrite, the configuration including the magnetic multilayer film whose thickness of the magnetic film satisfies fmax<v×cosθ/t enables the above-stated effect, that is, the magnetic recording/reproducing device can be substantially free from the influence of pseudo signals of the magnetic head.

INDUSTRIAL APPLICABILITY

As stated above, according to the present invention, a pseudo signal can be suppressed, and noise can be reduced.

Furthermore, a magnetic recording/reproducing device of the present invention can reduce the influence of a pseudo signal of a magnetic head to a substantially trivial level.

This invention claim is:

1. A magnetic head, in which a multilayer film is disposed, the multilayer film including metal magnetic films and non-magnetic films that are alternately laminated, and a boundary between the multilayer film and a magnetic oxide substrate or a non-magnetic substrate on which the multilayer film is to be formed is parallel with a gap section at a surface of the magnetic head for sliding with respect to a magnetic recording medium, wherein the metal magnetic films constituting the multilayer film each have a uniform thickness, and the uniform thickness t satisfies t<v×cosθ/fmax, where v denotes a relative speed of the head to a recording medium, fmax denotes an upper limit of frequencies to be used and θ denotes an azimuth angle.

2. The magnetic head according to claim 1, wherein the metal magnetic films constituting the multilayer film have a uniform thickness within a range of 100 nm to 2000 nm.

3. The magnetic head according to claim 1, wherein the magnetic films comprise a magnetic alloy film having a composition represented by the following formula:

TaMbXcNd where T denotes at least one element selected from the group consisting of Fe, Co and Ni, M denotes at least one element selected from the group constituting of Nb, Zr, Ti, Ta, Hf, Cr, Mo, W and Mn, X denotes at least one element selected from the group consisting of B, Si, and Ge, and N denotes nitrogen, wherein a, b, c and d represent atomic % satisfying 65≦a≦93, 4≦b≦20, 0≦c≦20, 2≦d≦20 and a+b+c+d=100, respectively.

4. The magnetic head according to claim 1, wherein the non-magnetic films comprise an oxide of Si, Al, Ti, Cr or Ta.

5. The magnetic head according to claim 1, wherein the substrate comprises: magnetic Mn—Zn ferrite single crystal; non-magnetic ferrite single crystal; α-hematite; calcium titanate or magnesium titanate.

6. A magnetic recording/reproducing device provided with a magnetic head, in which a multilayer film is disposed, the multilayer film including metal magnetic films and non-magnetic films that are alternately laminated, and a boundary between the multilayer film and a magnetic oxide substrate or a non-magnetic substrate on which the multilayer film is to be formed is parallel with a gap section at a surface of the magnetic head for sliding with respect to a magnetic recording medium, wherein the metal magnetic films constituting the multilayer film each have a uniform thickness, and the uniform thickness t satisfies t<v×cosθ/fmax, where v denotes a relative speed of the head to the recording medium, fmax denotes an upper limit of frequencies to be used and θ denotes an azimuth angle.

7. The magnetic recording/reproducing device according to claim 6, wherein the metal magnetic films constituting the multilayer film have a uniform thickness within a range of 100 nm to 2000 nm.

8. The magnetic recording/reproducing device according to claim 6, wherein the magnetic films comprise a magnetic alloy film having a composition represented by the following formula:

TaMbXcNd where T denotes at least one element selected from the group consisting of Fe, Co and Ni, M denotes at least one element selected from the group constituting of Nb, Zr, Ti, Ta, Hf, Cr, Mo, W and Mn, X denotes at least one element selected from the group consisting of B, Si and Ge, and N denotes nitrogen, wherein a, b, c and d represent atomic % satisfying 65≦a≦93, 4≦b≦20, 0≦c≦20, 2≦d≦20 and a+b+c+d=100, respectively.

9. The magnetic recording/reproducing device according to claim 6, wherein the non-magnetic films comprise an oxide of Si, Al, Ti, Cr or Ta.

10. The magnetic recording/reproducing device according to claim 6, wherein the substrate comprises: magnetic Mn—Zn ferrite single crystal; non-magnetic ferrite single crystal; α-hematite; calcium titanate or magnesium titanate.

* * * * *